United States Patent [19]

Kramer et al.

[11] Patent Number: 5,290,387
[45] Date of Patent: Mar. 1, 1994

[54] DEVICE FOR WELDING TUBULAR COMPONENTS OF PLASTICS MATERIAL

[75] Inventors: Herbert Kramer, Singen, Fed. Rep. of Germany; Bruno Hilpert, Diessenhofen, Switzerland

[73] Assignee: Georg FIscher AG, Schaffhausen, Switzerland

[21] Appl. No.: 499,365

[22] PCT Filed: Jun. 27, 1989

[86] PCT No.: PCT/CH89/00124
§ 371 Date: Apr. 20, 1990
§ 102(e) Date: Apr. 20, 1990

[87] PCT Pub. No.: WO90/00112
PCT Pub. Date: Jan. 11, 1990

[30] Foreign Application Priority Data

Jul. 4, 1988 [CH] Switzerland ............ 2532/88

[51] Int. Cl.5 ........................... B32B 31/00
[52] U.S. Cl. ........................ 156/359; 156/423; 156/499; 156/228; 156/294; 156/304.2; 156/309.9
[58] Field of Search ........... 156/304.2, 583.1, 359, 156/158, 423, 294, 499, 579, 309.9, 228, 507, 304.1

[56] References Cited

U.S. PATENT DOCUMENTS

| | | | |
|---|---|---|---|
| 4,174,996 | 11/1979 | Hunter | 156/499 |
| 4,631,107 | 12/1986 | Ramsey | 156/359 |
| 4,684,430 | 8/1987 | Handa et al. | 156/499 |
| 4,695,335 | 9/1987 | Lyall | 156/359 |
| 4,876,041 | 10/1989 | Hanselka | 156/304.2 |
| 4,927,642 | 5/1990 | Kunz | 156/418 |

Primary Examiner—David A. Simmons
Assistant Examiner—J. Sells
Attorney, Agent, or Firm—Anderson Kill Olick & Oshinsky

[57] ABSTRACT

A device for manufacturing a welded connection of tubular components of plastics material. The ends of the components to be connected are axially aligned and held to abut with the end surfaces. The ends of the tubular components can be heated by a foldable heating device which surrounds the tubular components. A support device is arranged in the interior of the tubular components. A heating device which can be fastened on a frame in a determined position is provided for each pipe diameter dimensioned to be welded. Electrical contacts are provided for each heating device. A welding program of a program control predetermined for each dimension can be selected by the contacts when the heating device is placed on the frame.

5 Claims, 3 Drawing Sheets

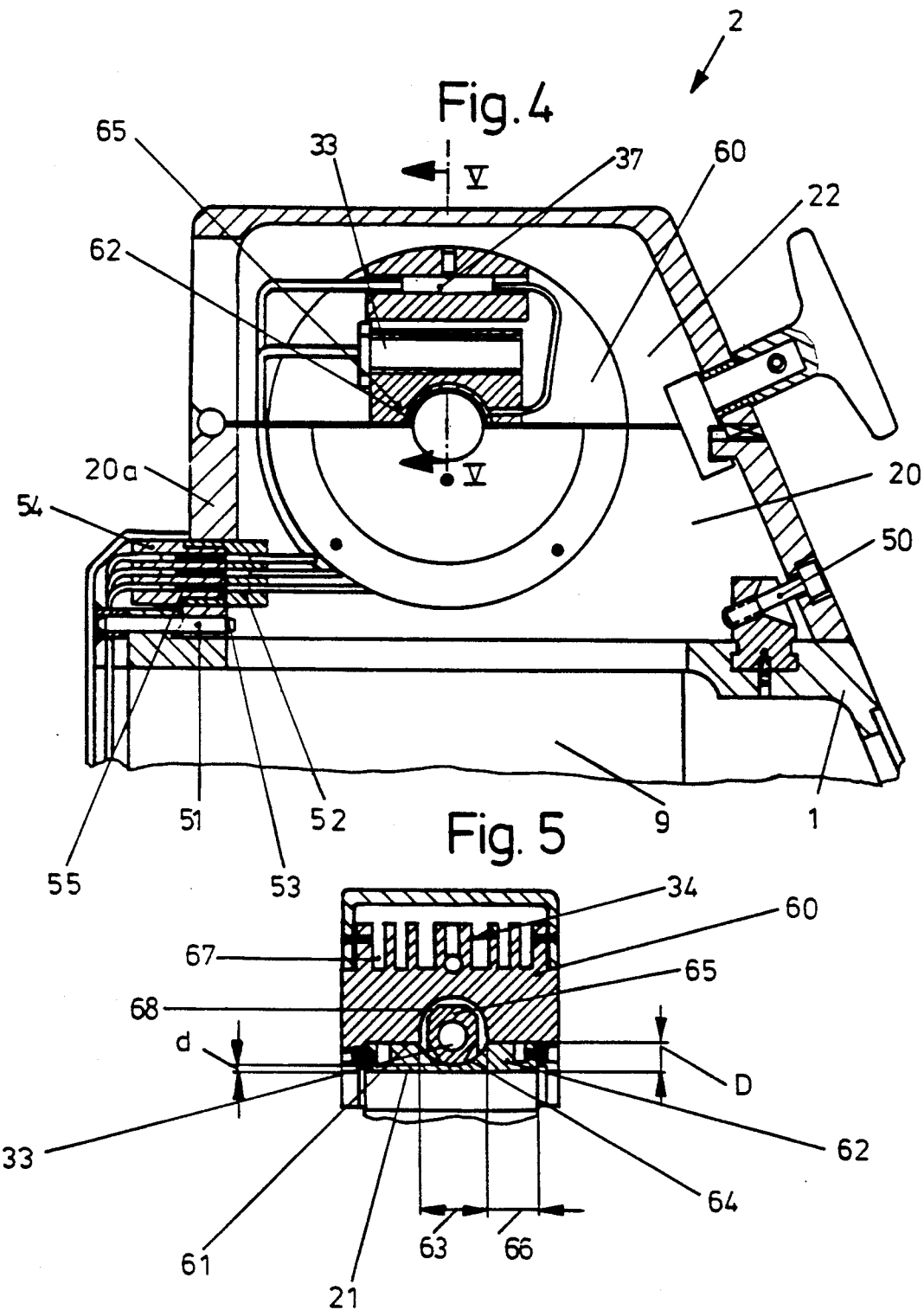

DEVICE FOR WELDING TUBULAR COMPONENTS OF PLASTICS MATERIAL

BACKGROUND OF THE INVENTION

1. Field of the Invention

The invention relates to a device for welding tubular components of plastics material, as characterized in the preamble of claim 1.

A device for welding tubular components is known in which the heatable jaws have at the inner circumference an annular duct in which a vacuum is generated during or after the welding process of the axially abutting tubular components. The vacuum has the purpose to prevent the molten material to drop inwardly or to prevent the formation of an inner bead at the welded connection. However, it has been found that it is not possible to manufacture welded connections by means of this method and by means of this device which are of sufficient strength and smooth at the inner circumference.

It is also known (DE-PS 283 0722), for reducing inner welding beads at the circumference of the tubular components, to arrange an elastic insert which presses against the inner welding bead.

However, for welding the tubular components, the ends thereof are heated by pressing them against heating elements and the ends are subsequently pressed together. A welded connection which is completely free of beads cannot be achieved by means of this method. In addition, by heating the front ends of the tubular components, the interior of these components may be contaminated, so that the necessary cleanliness is not achieved and the connection is not suitable for pipeline systems which conduct media having a high degree of purity.

A device of the above-mentioned type is known from DE-C2 29 23 205 by means of which welding of the ends of tubular plastic components which is free of beads is possible.

This device can only be used for one pipe dimension. The heating device has half shells of metal the middle portion of which is electrically heatable for the butt joint and the other portion at both ends seen in longitudinal direction is equipped with cooling chambers. This requires a complicated construction and a control of the individual zones which is very disadvantageous. In addition, the heating zone cannot be quickly cooled after the heating process which results in long welding times.

SUMMARY OF THE INVENTION

It is the object of the present invention to provide a device of the above-mentioned type by means of which it is possible to manufacture a bead-free and secure connection of tubular components of plastics material, wherein the device must be of simple construction and equipped for a problem-free operation even if used at the place of assembly of a pipeline system which is particularly intended for the conduction of media having a high degree of purity. In addition, it should be possible to use the device for welding tubular components having different diameters, while requiring short change-over times, short welding times and always resulting in uniformly excellent welded connections.

In accordance with the invention, the object is met by the characterizing features of claim 1.

BRIEF DESCRIPTION OF THE DRAWINGS

An example of the invention is illustrated in the enclosed drawings and is described in the following.

In the drawing:

FIG. 4 shows a partial section of a different embodiment of FIG. 2, wherein the section extends transversely through the heating device, and FIG. 5 shows a sectional view along line V—V of FIG. 4.

DESCRIPTION OF THE PREFERRED EMBODIMENTS

Figure 1:
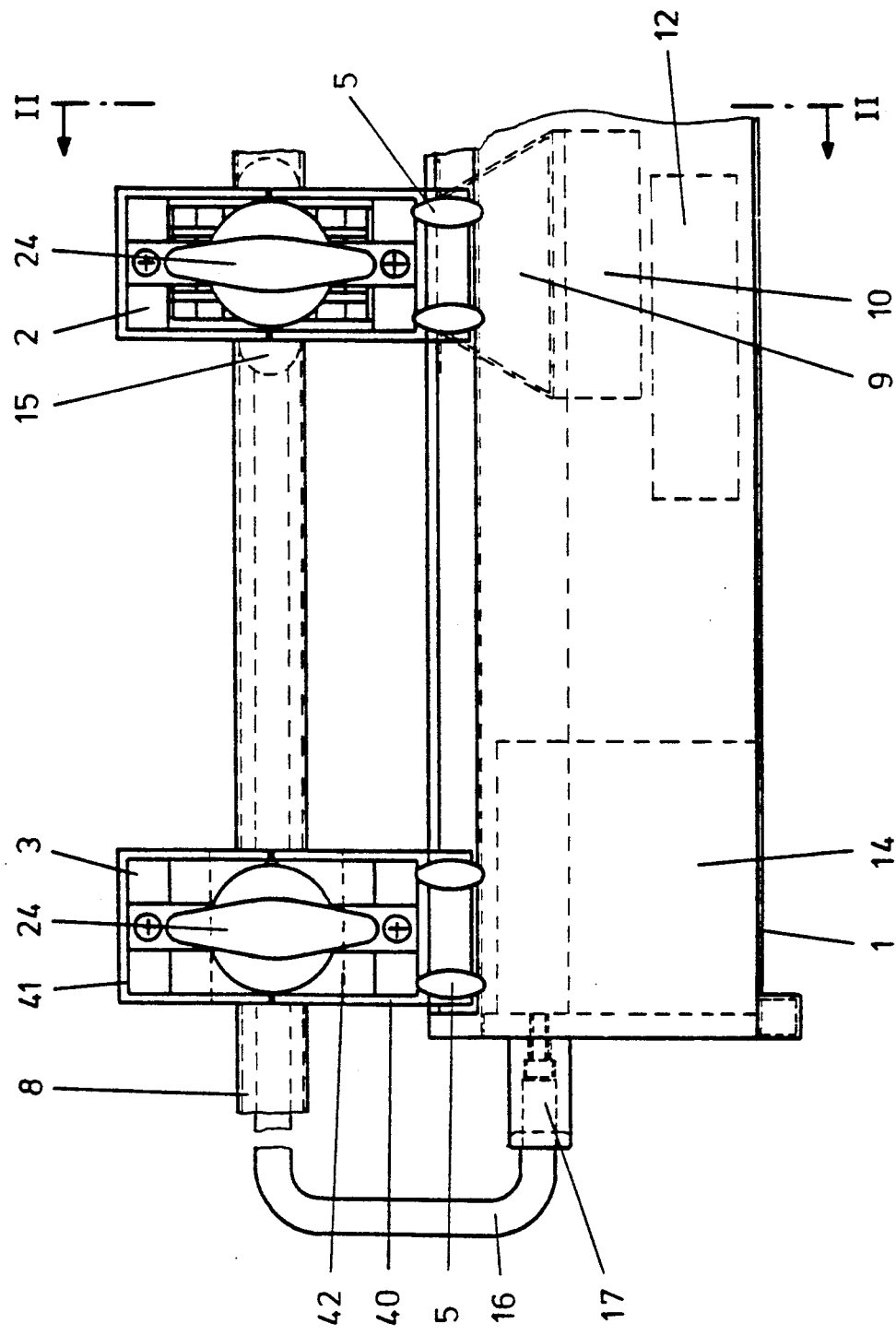
FIG. 1 shows a partial front view of a device for welding.

FIG. 1 shows a partial front view of the device with a frame 1, a heating device 2 and a pipe clamping device 3, wherein on the second side of the heating device 2 is provided another pipe clamping device, not shown.

Figure 2:
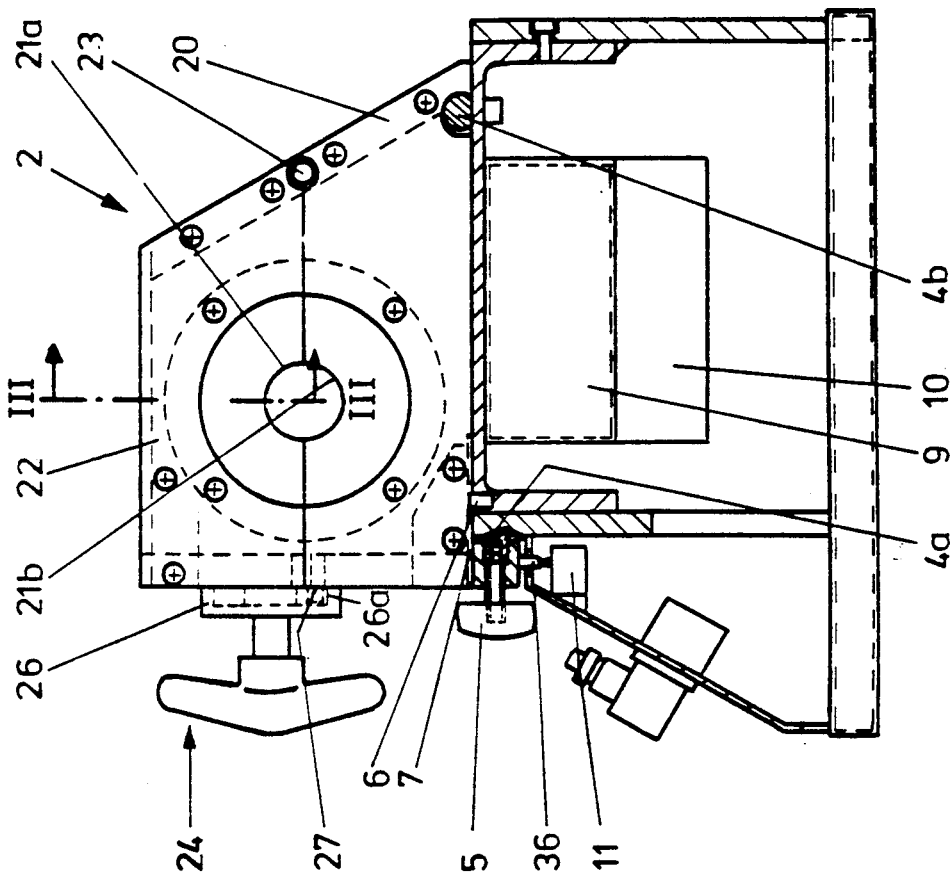
FIG. 2 shows a section along the line II—II of FIG. 1.

As can be seen in FIG. 2, guides 4a, 4b are arranged on the upper side of the frame 1. The pipe clamping devices 3 are slidable in longitudinal direction on the guides 4a, 4b and can be fixedly connected to the frame 1 by means of gripping devices 5.

The heating device 2 can be mounted on the guides 4a, 4b and can be fixedly connected by means of gripping devices 5, wherein positioning in longitudinal direction of the guides 4 is provided by a pin 6 arranged in the frame 1 which pin 6 engages in a corresponding recess 7 of the heating device 3.

As can be seen in FIG. 2, the heating device 2 is composed of a lower portion 20 with a receiving means 21a of semicircular cross-section for the tubular components 8 to be welded and an upper portion 22 with a corresponding receiving means 21b. The upper portion 22 is connected to the lower portion 20 by means of a hinge joint 23 so that the upper portion 22 can be folded up and the upper portion 22 and the lower portion 20 can be clamped together by means of a clamping device 24.

Figure 3:
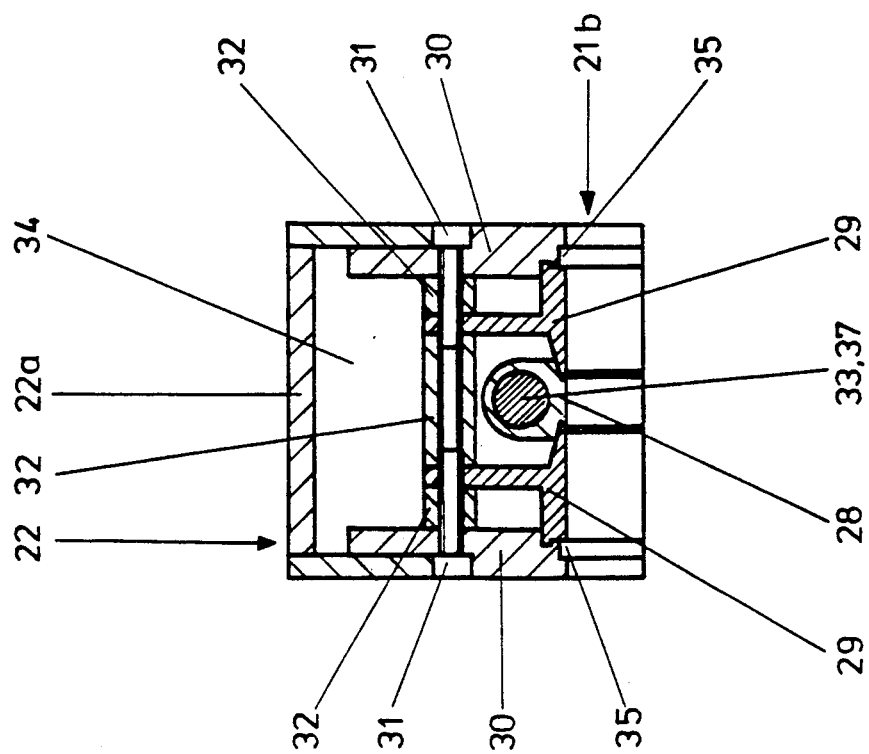
FIG. 3 shows a partial section along line III—III of FIG. 2.

The clamping device 24 has an eccentric disk 26 which is rotatable by means of a turning grip 25. The eccentric disk 26 has an eccentric inner clamping surface 26a which interacts with a clamping bolt 27 of the lower portion 20. As can be seen in FIG. 3, each of the two receiving means 21a, 21b has a concentrically arranged electrically heatable jaw 28 and holding jaws 29 on both sides of the heatable jaw 28, and sidewalls 30 which are fastened on a housing 20a or 22a of the lower portion 20 or upper portion 22, respectively.

The holding jaws 29 are of a poorly heat conducting material, such as, for example, a stainless steel and are fastened by means of screws 31 and spacer bolts 32 on the side walls 30, wherein the heatable jaw 28 is fixedly held between the holding jaws 29. The jaws 28 are of a material with good heat conductivity, such as, for example, copper and have each an electric heating cartridge 33 or another electric heating device. The inner walls of the housing 20a, 22a and the side walls 30 form a common duct 34 which surrounds the heatable jaws 28 and the holding jaws 29. Cooling air which can be generated by means of a ventilator 9 is conducted through the duct 34. The ventilator 9 is arranged directly underneath the heating device 2 in the boxshaped frame 1 and can be driven by means of an electric motor 10 (see FIGS. 1 and 2).

The side walls 30 have at the inner circumference a recess 35 which in shape and size corresponds to the beads on the tubular components 8 which ar to be welded together and are constructed as fittings. As a result, the fittings are held in the correct position in axial direction.

Each of the diameter dimensions of the tubular components to be welded together has its own heating device 2 which is placed on the frame. The heating device 2 is preferably constructed for the standard diameters 16, 20, 25, 32, 40, 50 and 65 mm. An electric switch 11 is provided on the frame 1 for each of the heating devices 2. The switches 11 are arranged next to each other in longitudinal direction of the guides 4.

When the heating device 2 for a certain diameter dimension is mounted, a pin 36 which is fixedly arranged on the heating device 2 actuates a switch 11 which corresponds to this heating device, and, consequently, a heating program of a program control 12 which is fixed for this dimension is adjusted. The program control 12 is arranged in the frame 1 and is operatively connected to a control panel, not shown, arranged at the front.

An electrically driveable small compressor 14 (schematically illustrated in FIG. 1) is additionally arranged in frame 1. The small compressor 14 is provided for generating compressed air for an expandable support device 15. The support device 15 is constructed as a bladder and is connected to the compressor by means of an air line 16. A pressure sensor 17 arranged in the air line 16 is operatively connected to the program control through a pressure adjusting device and ensures that the necessary pressure is maintained in the bladder during the welding procedure. The compressor is automatically switched on when the pressure drops.

Each pipe clamping device 3 has an upper portion 41 which is fastened to a lower portion 40 by means of a hinged joint 23 so that the upper portion 41 can be pulled up. Replaceable, half shell-shaped clamping jaws 42 are arranged in both portions. The clamping jaws 42 appropriate for each diameter dimension to be welded are then inserted and fastened in the lower portion 40 and the upper portion 41. The clamping device 24 for clamping together the lower portion 40 and the upper portion 41 is of the same construction as the clamping device in the heating device 2.

The electric heating cartridges 33 in the heating devices 2 each have a thermal sensor 37 and are operatively connected to program control 12.

The program control has an adjusting element corresponding to each electric switch 11 for adjusting a certain heating power The heating power is determined by integrating the measured temperature at the heating device over time. The integration begins at an adjustable temperature, such as, for example, 210° C.

FIGS. 4 and 5 show an embodiment of the heating device 2 which can also be mounted on a frame 1 and can be connected to the frame 1 in a determined position by means of a pin 51 and a gripping device 50. A plug component 52 which includes plug contact 53 is arranged in the housing 20a of the lower portion 20.

A second plug component 54 with plug contact 55 which corresponds to the plug contact 5 is inserted in the plug component 52 with simultaneous centering on pin 51 after the heating device 2 has been mounted.

Each of the plug components 52, 54 have preferably fifteen plug contacts 53 or 55, wherein always four are provided for the two heating cartridges 33 and four for the two thermal sensors 37. The connection of the contacts can be effected with the program control 12. Seven plug contacts are provided for coding the different heating devices 2 which are required for the different diameter dimensions. As a result, the welding program is activated in the program control 12 which is required for the respective diameter dimension. These plug contacts replace the electric switch 11 and the pin 36 described in connection with FIGS. 1 to 3, so that the device is simplified.

A holding component 60 each is fastened in the lower portion 20 and the upper portion 22 of the heating device 2. A heating jaw 62 each is arranged centered in a recess 61 of the holding component 60.

The heating jaw 62 has in the middle portion 63 a thin wall thickness toward the receiving means 21 because of a recess 64, so that a good heat passage is provided from the heating cartridge to the welding points.

A heating component 65 preferably of copper is arranged in the recess 64 and is fixedly connected by soldering to the heating jaw 6 which is of stainless steel. The heating cartridge 33 and the thermal sensor 37 are arranged inserted in the heating component 65. The temperature pattern can be determined in the middle portion 63 o the so-called heating zone by the shape of the recess 64 in the cross-section thereof. The portions 66 on both sides, which are the tempered zones, are less heated because they have a greater wall thickness D.

Recesses 67 are arranged on the outer circumference of the holding component 60. The recesses 67 form the duct 34 for conducting the cooling air generated by the ventilator 9.

A recess 68 is arranged on the inner circumference of the holding component 60 and in the middle with respect to the receiving means of the heating component 65. Cooling air is also conducted through the recess 68 for a quick cooling of the heating component 65 and, thus, of the welded connection.

This embodiment is otherwise constructed in the same manner as the device described with respect to FIGS. 1-3.

The welding procedure is carried out as described below.

The heating device 2 corresponding to the diameter dimension of the pipes or fittings to be welded is placed on the guides 4 and the corresponding clamping jaws 42 are inserted in the pipe clamping devices 3.

Pipes and fittings are mounted in the heating device and, in the case of pipes, in the pipe clamping device and are fixedly clamped by clamping the lower portion 22 or 41 against the lower portion 20 or 40 by means of the clamping devices 24.

By mounting the heating device 2, the corresponding welding parameters are automatically adjusted by switching of the corresponding electric switch 11 or by the plug contacts 53, 55. When the pipes or fittings are mounted, the bladder 15 is arranged in the interior in the region of the welded connection. By pressing the "start" key, the following sequence is automatically released:

1. The bladder is pressurized by switching on the compressor.
2. The heating is switched on, wherein the adjusted maximum temperature (200° to 300° C.) is quickly reached without overshooting. The heating energy required for each dimension was adjusted prior to the welding procedure. The heating energy integration begins at approximately 210° C.
3. The heating is switched off after the adjusted heating energy has been reached.
4. The cooling air ventilator is switched on until and adjustable temperature of approximately 90° C. has been reached.
5. The supply of cooling air is switched off. Simultaneously, the pressure is relieved from the bladder.
6. The welding procedure is concluded. The welded pipes or fittings are removed from the device and the bladder is pulled out.

The device is ready for manufacturing the next welded connection.

We claim:

1. A device for manufacturing a welded connection of tubular components of plastics material, the tubular components having ends, wherein the ends of the components to be connected are axially aligned and held to abut with end surfaces thereof, and wherein the ends of the tubular components can be heated by means of a foldable heating device which surrounds the tubular components, the device comprising a support device arranged in the interior of the tubular components, a heating device (2) which can be fastened on frame (1) in a determined position being provided for each pipe diameter dimension to be welded, electrical contacts (53, 55, 11) being provided for each heating device (2) means for selecting a welding program of a program control (12) predetermined for each dimension by means of the contacts (53, 55, 11) when the heating device (1) is placed on the frame, a changeable heat energy supply which is adjustable over time being provided for each welding program, the heating device (2) including electrically heatable jaws (28, 62) and electric heating cartridges (33) for heating the heating jaws (28), the heating jaws (28) having thermal sensors (37) which are operatively connected to the program control (12), wherein the electrical contacts (53, 55) are arranged in a first plug component (54) arranged on the frame (1) and on a second plug component (52) arranged in the heating devices (2), wherein the electrically heatable jaws (28, 62) are surrounded by a common duct (34) which is operatively connected to a ventilator (9) which produces cooling air, the ventilator (9) being arranged in the frame (1) directly underneath the heating device (2), and wherein the heating jaws (62) have in a middle portion (63) thereof a thin wall thickness compared to adjacent portions (66) thereof located on both sides of the middle portion.

2. The device according to claim 1, wherein the frame (1) has longitudinal guides (4) on which the heating device can be fastened in a determined position and wherein at least one foldable pipe clamping device (3) with clamping jaws (42) can be gripped in a position which is adjustable in longitudinal direction.

3. The device according to claim 1, wherein an electrically driveable compressor (14) is arranged in the frame (1) for generating compressed air.

4. The device according to claim 3, wherein the compressor (14) is connected by means of an air line (16) to a support device (15) which is constructed as a bladder and can be expanded by compressed air.

5. The device according to claim 1, wherein each heating jaw (62) is fixedly connected in the middle portion (63) with a heating component (65) which is of copper and includes the heating cartridge (33), and that the heating jaw (62) is of stainless steel.

* * * * *